Figure 1:
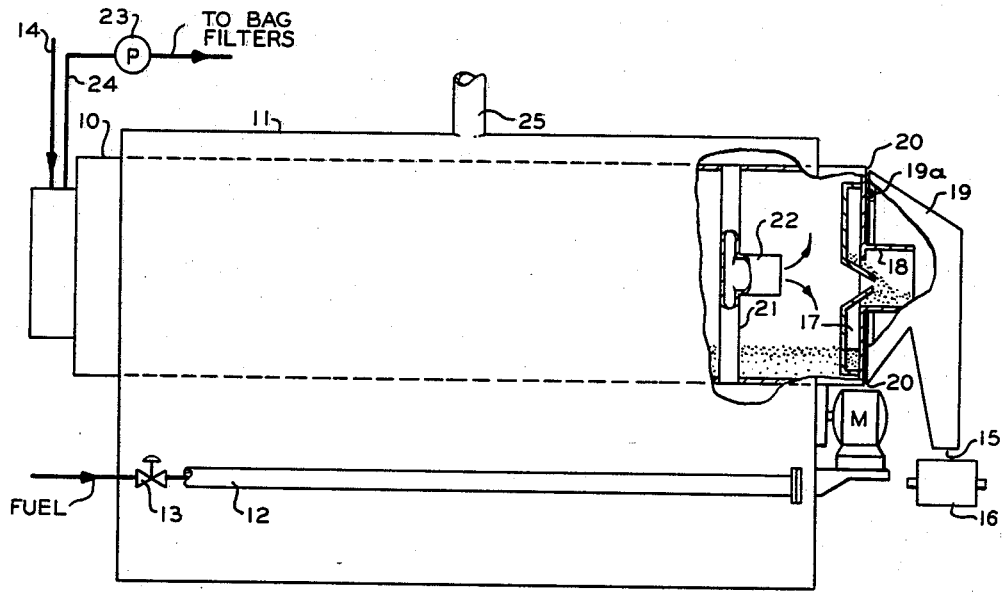

Feb. 2, 1965          B. F. LOEWEN          3,168,383
DRYING OF WET CARBON BLACK PELLETS
Filed June 16, 1960

INVENTOR.
B. F. LOEWEN
BY Hudson and Young
ATTORNEYS

United States Patent Office 3,168,383
Patented Feb. 2, 1965

3,168,383
DRYING OF WET CARBON BLACK PELLETS
Bruno F. Loewen, Borger, Tex., assignor to Phillips
Petroleum Company, a corporation of Delaware
Filed June 16, 1960, Ser. No. 36,646
6 Claims. (Cl. 34—137)

This invention relates to dryers of particulate material and to a method for drying particulate material. In one aspect this invention relates to an improved process and means for drying wet carbon black pellets.

In the wet pelleting of carbon black as practiced commercially the wet pellets emerge from the forming step containing about 45 to 55 weight percent of water and generally about 50 percent. It is necessary to dry the pellets before storage or shipment and the effluent pellets from the pelleting mills are passed through a dryer where they are contacted with a purge gas comprising gaseous products of combustion resulting from burning fuel to supply heat to the dryer. Rotary dryers are known for the drying of granular material such as carbon black pellets and comprise a drum rotating within a furnace and tilted from the horizontal so that the granular material traverses the longitudinal length of the drum as it is tumbled by the rotary action of the drum. A burner or a plurality of burners located in the furnace beneath the rotating drum provide the heat for drying the granular material and usually a portion of the combustion gases from the furnace are passed through the rotating drum as purge gas to carry out the released moisture. In the past, it has been the general practice to introduce the purge gas into the stationary hood at the effluent end of the dryer so that the purge gas passes through the rotating drum in countercurrent flow relationship to that of the granular material or pellets. The carbon black pellets in a carbon black pellet dryer are accompanied by a considerable amount of finely divided, loose carbon black. One problem in this drying process results from the lack of a good seal at the wear ring between the stationary hood and the rotating drum, resulting in a continuous leakage of purge gas through this seal carrying with it finely divided carbon black suspended in the purge gas. The constant leakage of purge gas with its accompanying finely divided carbon black represents a waste of carbon black as well as the nuisance which results from releasing this finely divided carbon black from the pellet dryer.

Figure 2:
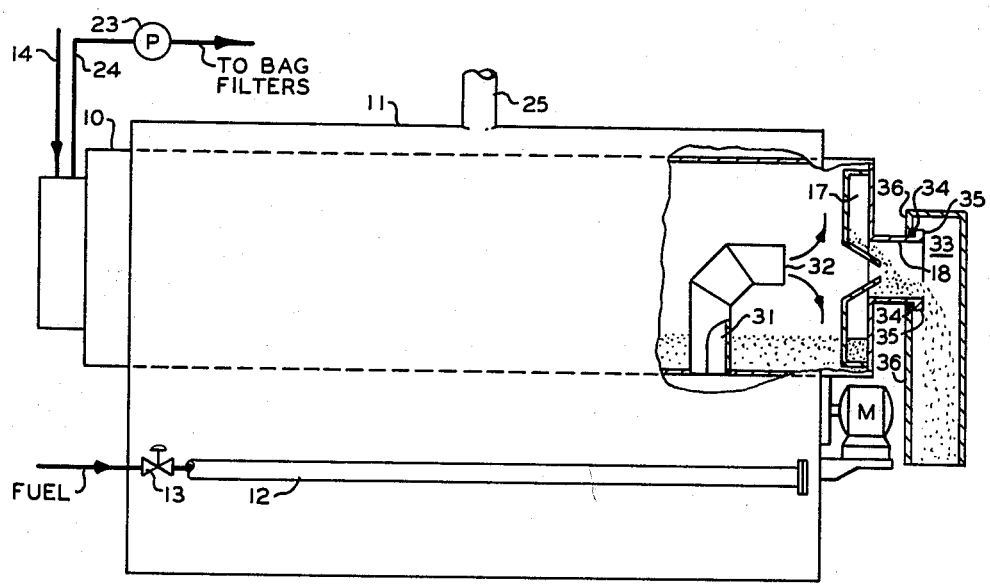

It is therefore a principal object of this invention to provide a method and means to eliminate or reduce the escape of finely divided carbon black from the seals of a carbon black pellet dryer. It is also an object of this invention to provide a method and means for reducing the turbulence in the gases present in the stationary hood at the effluent end of a rotary dryer. Further objects and advantages resulting from the practice of this invention will be apparent to one skilled in the art upon study of this disclosure including the drawing wherein:

FIGURE 1 is a diagrammatic view, partly in section, of a rotary dryer embodying the invention and adapted to carry out the method of the invention; and FIGURE 2 is a modification of the invention as illustrated in FIGURE 1.

Broadly the invention contemplates introducing the purge gas to the interior of the rotating drum at a point upstream, with respect to flow of pellets, from the stationary hood at the effluent end of the dryer. This can be accomplished by installing a conduit across the diameter of the drum open to the outside of the drum and having an opening at its center to convey purge gas from the exterior of the drum to the interior of the drum at about the circumferential center thereof. This can also be accomplished by installing a conduit through the periphery of the drum open to the exterior of the drum and open to the interior of the drum at about the circumferential center thereof.

Referring now to the drawing, and particularly to FIGURE 1, dryer drum 10 is rotatably positioned in furnace 11 and is heated by burning fuel, such as fuel gas introduced to burners within the furnace (not shown) through conduit 12. The quantity of fuel is controlled by valve 13 which can be a motor valve actuated by a temperature sensitive device which is sensitive to temperature at a chosen position in the dryer and also not shown here because it is not necessary for an understanding of the invention. The wet feed is introduced via conduit 14 and the dried, granular material, such as pelleted carbon black, is removed at 15 and conveyed to storage or packaging facilities by conveyor belt indicated at 16. Pellets are picked up from drum 10 by scoops 17 and passed into tube 18 from which they gravitate into hopper 15 in stationary hood 19.

In the past it has been the practice to remove combustion gases which are to be used as the purge gas from the furnace 11 by means of a conduit (not shown) and to introduce this purge gas to the interior of the rotating drum via stationary hood 19. In operating a dryer as just described, purge gas leaks from the wear rings 20 which provide the only seal between drum 10 and the edge 19a of a stationary hood 19, carrying with it finely divided carbon black which is lost to the process and is released onto the ground and to the atmosphere where it creates a nuisance. It is difficult, if not impossible, to obtain and to maintain a seal between the rotating drum and stationary hood which will effectively prevent loss of carbon black at this point.

According to the present invention a conduit indicated as 21 is installed across the diameter of the rotating drum at a position, upstream from the stationary hood 19 with respect to flow of pellets. The conduit 21 is open at each end and is in communication with the combustion gases in the furnace 11. A short piece of conduit indicated at 22 can be secured to conduit 21 at about its center and on the downstream side of conduit 21 with respect to the flow of pellets within the drum 10 and is open at each end so as to be in communication with the interior of drum 10 and the interior of conduit 21 so that the purge gas from furnace 11 passes through conduit 21 and conduit 22 into the interior of rotating drum 10 where it reverses its direction and exits at the pellet feed entrance end of rotating drum 10. A positive flow of purge gas is obtained by means of pump or blower 23 positioned in conduit 24 so as to remove the purge gas from the rotating drum 10 and pass same to bag filters (not shown) for removal of carbon black suspended therein. The purge gas, after removal of the suspended carbon black, is vented to the atmosphere or passed to stack 25 for disposal. The conduit 22 can be the length required to introduce the purge gas to the interior of drum 10 at the desired locus. If conduit 21 is positioned at the locus where it is desired to introduce the purge gas, conduit 22 can be omitted. The diameter of the conduit 21, and/or conduit 22, is not critical so long as cross sectional area of the conduit is sufficient to avoid an excessive pressure drop or turbulence of the purge gas at the entrance to drum 10. Furthermore, the locus at which the purge gas is introduced is not critical but is preferably as near to the pellet discharge end of the drum as possible without causing turbulence of the atmosphere in the stationary hood 19 so that the purge gas will traverse substantially the entire length of the drum.

FIGURE 2 illustrates a modification of the dryer of FIGURE 1 wherein the purge gas is introduced to the interior of drum 10 by means of a conduit 31 which projects from the periphery of drum 10 to about the axis of rotation of drum 10 and is turned to face the pellet discharge end of drum 10.

The hood 33 makes contact with drum 10 at the rear ring 34 wherein a flange 35 at the end of conduit 18 makes a seal with the edge 36 of hood 33. Materials such as molded fibrous asbestos can be used to face the edge 36 to provide the wear ring 34. Materials such as are used for automobile brake linings can be used.

The practice of the present invention avoids creating turbulence in the stationary hood at the pellet discharge end of the dryer and therefore avoids suspending a substantial amount of loose black in the gases which form the atmosphere within the rotating drum. The tendency for carbon black to escape through the wear ring is substantially completely eliminated and the quantity of carbon black carried out of the dryer with the purge gas is greatly reduced.

Reasonable variations and modifications are possible within the scope of this disclosure without departing from the spirit and scope of the invention.

That which is claimed is:

1. Apparatus for drying carbon black pellets comprising, in combination, a rotatable drying tube having a stationary hood enclosing each open end thereof; a wear ring attached to each stationary hood so as to contact the adjacent end of said tube as a seal between said hood and said tube; means for feeding wet pellets to one stationary hood and means for removing dry pellets from the other hood; a stationary housing enclosing said tube; a furnace in communication with said housing to supply hot combustion gases to the annulus between said housing and said tube; a single means for supplying combustion gases from said annulus to the interior of said tube comprising a first conduit communicating with said annulus and the interior of said tube at about its axis of rotation spaced from and adjacent the stationary hood having means for removing dry pellets therefrom, said conduit having an opening in communication with the interior of said tube facing said stationary hood having means for removing dry pellets therefrom; a second conduit communicating with the stationary hood having means to feed wet pellets thereto; and blower means in said second conduit to cause combustion gases to pass through said first conduit, said rotatable tube and said second conduit.

2. The apparatus of claim 1 wherein said first conduit comprises a conduit positioned across the diameter of the drum, open at each end and having an opening at about its center facing downstream with respect to the flow of pellets.

3. The apparatus of claim 2 wherein a conduit open at each end is secured to the opening at the center of the conduit positioned across the diameter of the drum.

4. The apparatus of claim 1 wherein said first conduit projects from the periphery of said drum to about the axis of rotation of said drum and is turned so that the open end within said drum faces the pellet discharge end of said drum.

5. The method of reducing carbon black loss from a heated, rotary drum, carbon black pellet dryer having a stationary hood at each end of the drum with a wear ring between the stationary hood and the adjacent end of the drum to effect a seal between the rotating drum and stationary hood and wherein a portion of combustion gases resulting from burning fuel to supply heat to said drum is utilized as purge gas to remove moisture released from the pellets passing therethrough which comprises introducing said purge gas to the interior of said drum at its axis of rotation and at a single point spaced from and adjacent the pellet exit end of said drum and concurrent with the flow of pellets; and withdrawing said purge gas from the opposite end of said drum so that said purge gas reverses its direction and sweeps substantially the entire length of said drum.

6. In a process for drying wet carbon black pellets wherein said pellets are passed through a heated, rotating drying zone and the dried pellets are discharged into a stationary receiving zone communicating with said rotating drying zone and having a wear ring seal between said stationary receiving zone and said rotating drying zone and wherein a portion of the combustion gases resulting from burning fuel to heat said drying zone is passed through said drying zone in countercurrent flow relationship with respect to the flow of pellets as purge gas to remove moisture from said drying zone, the improvement comprising introducing said purge gas to said drying zone at its axis of rotation and at a single point spaced from and adjacent said stationary receiving zone and concurrent with the flow of pellets so that the gas reverses its direction and sweeps substantially the entire length of said drying zone without creating turbulence in said stationary receiving zone.

References Cited in the file of this patent

UNITED STATES PATENTS

| | | |
|---|---|---|
| 333,825 | Cadwell | Jan. 5, 1886 |
| 546,655 | Cummer | Sept. 24, 1895 |
| 900,032 | McCarter | Sept. 29, 1908 |
| 1,179,192 | Kleinschmidt | Apr. 11, 1916 |
| 1,431,037 | Prindle | Oct. 3, 1922 |
| 2,244,035 | Whitmore | June 3, 1941 |

FOREIGN PATENTS

| | | |
|---|---|---|
| 325,582 | Great Britain | Feb. 24, 1930 |